United States Patent [19]

Freeman

[11] Patent Number: 4,653,529
[45] Date of Patent: Mar. 31, 1987

[54] PLANT WATERING DEVICE

[76] Inventor: Geoffrey W. Freeman, 33 Markland Street, St. John's, Newfoundland, Canada, A1E 4A8

[21] Appl. No.: 862,931

[22] Filed: May 14, 1986

[51] Int. Cl.$^4$ .................................. F16K 31/12
[52] U.S. Cl. .................... 137/453; 137/78.2; 137/454; 47/79; 222/56; 222/64; 239/63; 239/193
[58] Field of Search ............. 47/48.5, 79; 119/77; 137/78.1, 78.2, 78.3, 393, 453, 454, 571, 587, 590; 222/56, 64, 69; 239/63, 65, 193, 379

[56] References Cited

U.S. PATENT DOCUMENTS

| 267,296 | 11/1882 | Wilder | 47/79 |
| 2,818,877 | 1/1958 | Swanson | 47/79 |
| 3,125,255 | 3/1964 | Kaiser | 239/63 |
| 3,438,575 | 4/1969 | Rohling | 47/79 |
| 4,057,933 | 11/1977 | Enyeart | 47/79 |
| 4,085,546 | 4/1978 | Hallar | 47/79 |
| 4,121,608 | 10/1978 | MacLeod | 47/79 |
| 4,241,538 | 12/1980 | Lahr | 47/79 |
| 4,447,983 | 5/1984 | Shinada | 47/79 |
| 4,542,762 | 9/1985 | Littlehale | 239/63 |
| 4,578,897 | 4/1986 | Pazar et al. | 239/63 |

FOREIGN PATENT DOCUMENTS

| 1757347 | 6/1971 | Fed. Rep. of Germany | 47/79 |
| 1296711 | 12/1962 | France | 47/79 |
| 2343282 | 9/1977 | France | 47/79 |
| 1513876 | 6/1978 | United Kingdom | 47/79 |

Primary Examiner—George L. Walton
Attorney, Agent, or Firm—Sughrue, Mion, Zinn, Macpeak and Seas

[57] ABSTRACT

An intermittently operating watering device has a water reservoir for supplying successive flows of water to a pair of receptacles which are separated from one another by a weir. The water also flows into an air space where it covers the lower end of an air passage communicating with an air space at the top of the interior of the water reservoir so that, each time evaporation of the water uncovers the lower end of the air passage to allow the inflow of air, water is able to flow out from the water reservoir to the receptacles. The reservoir is in one of the receptacles and a plant in the other receptacle is irrigated at successive intervals of time.

7 Claims, 10 Drawing Figures

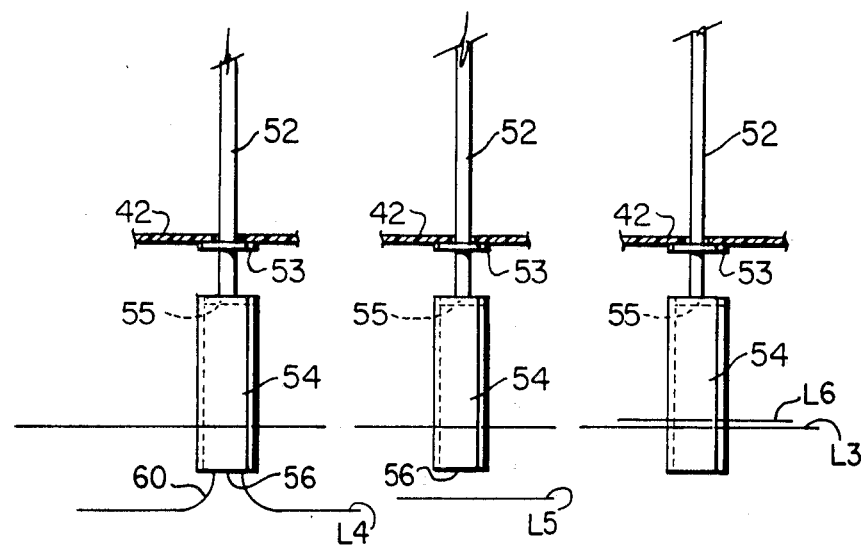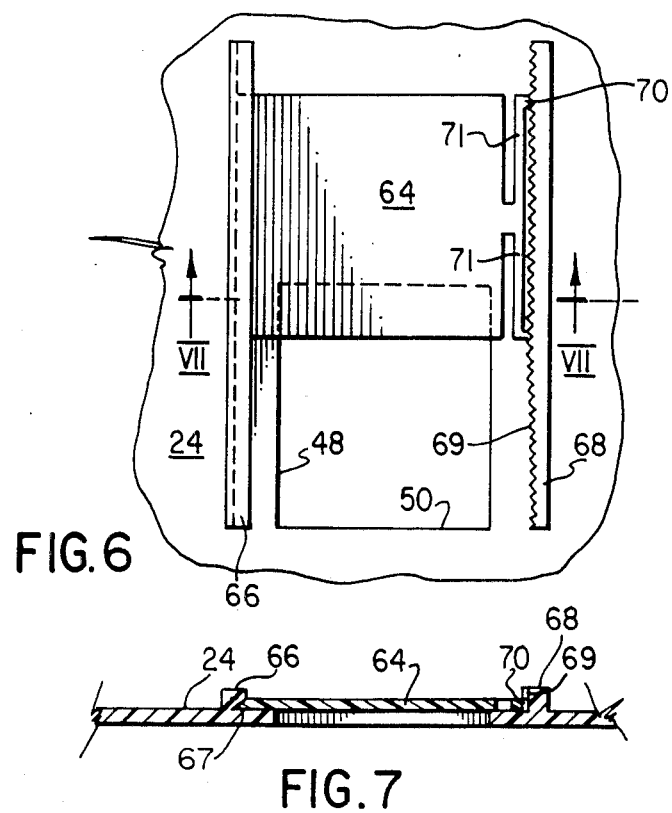

PLANT WATERING DEVICE

FIELD OF THE INVENTION

The present invention relates to a watering device and is useful, in particular, for watering plants.

BACKGROUND OF THE INVENTION

It has already been well recognized that there is a need for a plant watering device which will ensure an adequate supply of water to a plant after a considerable lapse of time and without human intervention, after initial setting up of the device.

Thus, for example, a person leaving his or her dwelling for a period of time, for example for the purpose of a vacation, often requires to ensure that a plant in the dwelling is adequately irrigated during that period of time but, nevertheless, frequently desires to avoid overwatering of the plant and, also, to avoid granting access to another person to the dwelling for the purpose of watering the plant.

Various attempts have been made in the past to provide a watering device which fulfills such a purpose by providing a constant, possibly very slow, supply of water to a plant, or by effecting a delayed supply of water to the plant.

For example, one prior watering device comprises a tray to be placed under a pot containing the plant, with a wick extending from the tray through the base of the pot and terminating in a potting mix within the pot, so that water is drawn up the wick by a wicking action.

Another prior device comprises a large tray fitted with a porous styrofoam base for a plant pot and, in that case, moisture percolated up to the pot from the tray by capillary action trough the styrofoam base.

Another prior suggestion is a cone shaped device made of pottery, which is glazed at the open end of the cone-shaped device, the opposite, pointed end of the device being closed but remaining unglazed, so that when the cone is inverted and pushed into the soil, and the inside of the device is filled with water, the water is slowly released through the pointed end of the device to water the plant and, thereby, to prevent it from drying out.

It will be appreciated that the above-described devices are intended to effect constant watering of a plant, rather than providing a delayed supply of water to the plant after a period of time during which no watering occurs.

A further prior art watering device is shown in U.S. Pat. No. 267,296, which teaches a self-irrigating flower pot or vase in which apertures allow water to pass from a reservoir into a saucer and then into the pot. Evaporation from the saucer and absorption of water in the pot cause the liquid level in the saucer to fall below the apertures, which allows further water to flow from the reservoir. Once again, this prior device constantly waters the pot.

U.S. Pat. No. 3,125,255, issued Mar. 17, 1964 to B. Kaiser, shows the use of evaporation from an auxiliary reservoir to control air flow into a main reservoir and, thus, to control the outflow of water from the main reservoir. More particularly, according to the teachings of this prior device, evaporation from a so-called water receiver uncovers the lower end of a tube, to allow air to flow into a main container, which in turn allows water to flow therefrom through an outlet.

While the device shown in the aforesaid U.S. Pat. No. 3,125,255 effects delayed watering of a plant or the like, by employing evaporation in a separate water chamber to delay the onset of irrigation, as described above, it nevertheless simply allows a single flow of water from the main container at a delayed period of time but in a continuous manner, and does not in any way enable an intermittent, i.e. repeated, watering action to be effected.

Further prior art watering devices are shown in U.S. Pat. Nos. 3,438,575; 4,060,934; 4,085,546; 4,121,608; 4,241,538 and 4,542,762.

BRIEF SUMMARY OF THE INVENTION

It is an object of the present invention to provide a novel and improved watering device which not only enables water to be supplied after a predetermined delay, but also enables an intermittent supply of the water.

It is a further object of the present invention to enable a plant to be watered repeatedly, at successive time intervals.

It is a still further object of the present invention to provide a watering device which delivers successive flows of water in dependence on the rate of evaporation of water from the device, so that in hot dry weather the device will dispense water more frequently than during damp, cold conditions.

According to the present invention, there is provided a watering device which has a reservoir defining a first air-tight space within an upper portion of the reservoir, a first water receptacle for receiving flows of water from a water reservoir and a second water receptacle for receiving flows of water from the first water receptacle.

A weir between the first and second water receptacles retains the water at a first predetermined level in the first receptacle to prevent unintended loss of water from the reservoir.

For controlling the flow of water from the water reservoir to the water receptacles, there is provided a second air space which is open to the atmosphere and an air passage having an open top end in the first air space of the water reservoir and an open bottom end in the second air space.

The first receptacle communicates at a second predetermined level with the second air space, the second level being higher than the first predetermined level and, also, higher than the open bottom end of the air passage. Consequently, when water is supplied from the water reservoir to flood the receptacles, the open bottom end of the air passage thereafter becomes immersed, which prevents the further flow of water from the water reservoir to the receptacles until evaporation of water from the second air space allows, once again, the entry of air through the air passage into the first air space and, thus, allows the flow of water from the water reservoir to flood the first and second receptacles.

BRIEF DESCRIPTION OF THE DRAWINGS

Further objects, features and advantages of the invention will appear from time to time from the following description of embodiments thereof given, by way of example, with reference to the accompanying drawings, in which:

FIGS. 5A, 5B and 5C show diagrams representing parts of the water flow control unit during successive periods of a cycle of operation of the plant watering device of FIG. 1;

FIG. 6 shows a broken-away view of a part of a modification of the water reservoir and water flow control device in side elevation;

FIG. 7 shows a broken-away view taken in section along the line VII—VII of FIG. 6;

DESCRIPTION OF THE PREFERRED EMBODIMENTS

Figure 1:
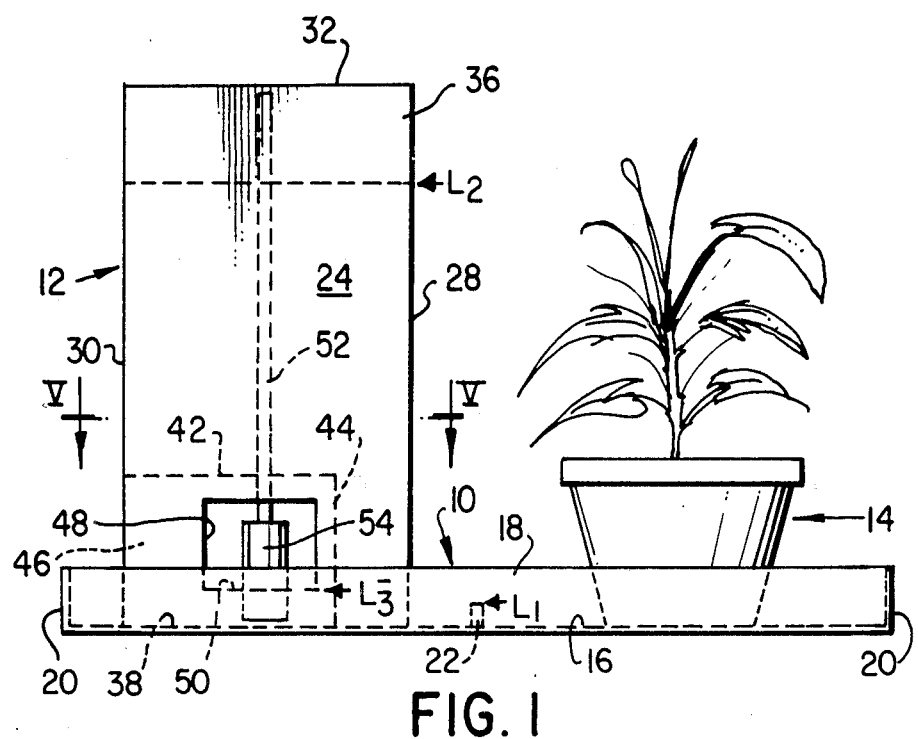
FIG. 1 shows a view in side elevation of a plant watering device according to a preferred embodiment, provided with a pot containing a plant.

The plant watering device shown in FIG. 1 comprises a tray, indicated generally by reference numeral 10 and a water reservoir and water flow control unit indicated generally by reference numeral 12, with a plant pot indicated generally by reference numeral 14 standing in the tray 10.

Figure 2:
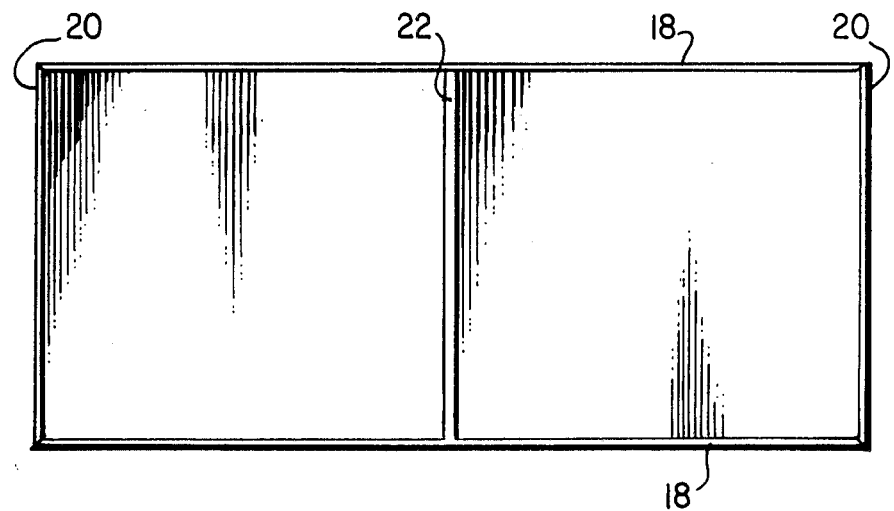
FIG. 2 shows a plan view showing a tray forming part of the plant watering device of FIG. 1.

As can be seen from FIGS. 1 and 2, the tray 10 has a bottom 16, opposite side walls 18 and opposite end walls 20.

A partition wall 22 molded in one piece with the tray bottom 16 and the side walls 18 and extending upwardly from the tray bottom 16 to a level $L_1$ forms a weir which divides the interior of the tray 16 into a first receptacle, which is on the left-hand side of the partition wall 22 as viewed in FIG. 2, and a second receptacle, which is on the right-hand side of the partition wall 22 as viewed in FIG. 2.

It will be observed that the level $L_1$ is substantially lower than the tops of the side walls 18 and the end walls 20.

The water reservoir and water flow control unit 12, which for simplicity is referred to below as the water supply unit 12, has front and rear walls 24 and 26, opposite side walls 28 and 30 and a top 32 which cooperate to define a first air-tight chamber or space 36 above a supply of water contained within the water supply unit 12 and having a surface level $L_2$, above which the air space 36 contains air at sub-atmospheric pressure.

The lower end of the water supply unit 30 is provided with a bottom 38 which is formed with an outlet opening 40 through which the water can flow from the interior of the water supply unit 12, as is described in greater detail below.

The water supply unit 12 is also provided with a horizontal partition wall 42, which extends to the front and rear walls 24 and 26 and the side wall 30, but is spaced from the side wall 28, and a vertical partition wall 44 which extends downwardly from the horizontal partition wall 42 to the bottom 38 and which also extends to the front and rear walls 24 and 26. The partition walls 42 and 44 define, with the walls and bottom of the water supply unit 12, a second air space, indicated by, reference numeral 46, which communicates with the atmosphere through a rectangular opening 48 in the front wall 24 and through a corresponding rectangular opening (not shown) in the rear wall 26.

Figure 3:
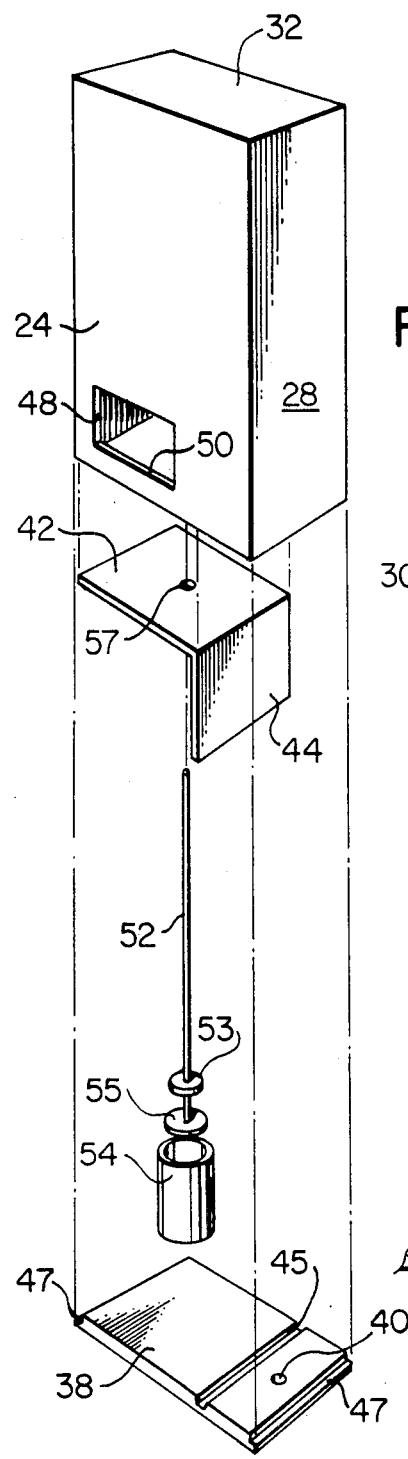
FIG. 3 shows an exploded view of a water reservoir and water flow control unit forming part of the plant watering device of FIG. 1.
Figure 4:
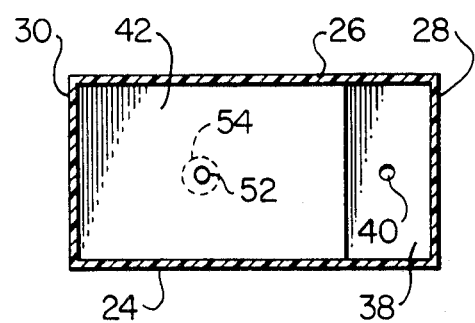
FIG. 4 shows a view taken in horizontal cross-section through the unit of FIG. 3.

As can be seen from FIG. 3, the horizontal partition wall 42 and the vertical partition wall 44, which like the other components of the water supply unit 12 are made of synthetic plastic material, are formed in one piece. The lower edge of the vertical partition wall is engageable in a slot 45 extending transversely across the bottom 38, the opposite ends of which are stepped to form shoulders 47 engageable with the lower edges of the walls 28 and 30 of the water supply unit 12. The edges of the horizontal and vertical partition walls 42 and 44 and of the bottom 38 are sealingly secured to the walls 24, 26, 28 and 30 of the water supply unit 12, and the lower edge of the vertical partition wall 44 is likewise secured in the slot 45 to the bottom 38, by an adhesive (not shown).

When the water supply unit 12 stands on the bottom 16 of the tray 10 as shown in FIG. 1, the lower edge of the opening 48, which is indicated by reference numeral 50 and which extends horizontally, is located at a level $L_3$ which is higher than the level $L_1$, for the purpose to be described below.

Within the water supply unit 12 there is provided a vertical tubular air passage 52 which has an open top located at a small distance below the top 32 of the water supply unit 12.

The tubular air passage 52 extends downwardly, through the horizontal partition wall 42 and into the air space 46, to a tubular lower end portion 54 having a downwardly-open lower end 56, the tubular portions 52 and 54 communicating with one another to form an air passage extending from the lower end 56 of the tubular portion 54 to the upper end of the tubular portion 52.

The lower end 56 is located at a small spacing above the bottom 38 of the water supply unit 12 within the air space 46.

To facilitate installation of the tubular air passage 52 and the tubular lower end portion 54, the air passage 52 is formed with upper and lower integral annular flanges 53 and 55. On assembly of the components of the water supply unit 12, the tubular air passage 52 is inserted upwardly through a circular opening 57 in the horizontal partition wall 42 and the upper flange 53 is secured to the underside of the horizontal partition wall 42 by an adhesive, which seals the upper flange 53 to the horizontal partition wall 42 around the opening 57 and, thus, seals the opening 57.

The lower flange 55 fits into, and is sealed by adhesive to, the top of the tubular lower end portion 54.

To refill the water supply unit 12, the unit is brought to a sink, inverted and filled with water through the opening 40.

Alternatively, an inlet opening (not shown) provided with an appropriate air-tight and water-tight closure member, e.g. a screw cap, (not shown) may be provided in the top 32 for supplying the water to the interior of the water supply unit 12.

The unit 12 is then returned to its tray 10 by holding a finger over the opening 40 to prevent the outflow of water while the unit is restored to the upright for non-inverted position in which it is shown in the drawings, the finger being removed as the unit 12 is lowered onto the tray 10.

In operation, with the water supply unit 12 thus filled with water and standing in the tray 10 as shown in FIG. 1, air from the atmosphere can enter the air space 46 through the opening 48 and, hence, can enter the air passage comprising the tubular portions 52 and 54 through the open lower end 56 of the latter, so that this air can flow into the air space 36.

This entry of air into the air space 36 allows some water to flow out from the water supply unit 12, through the outlet opening 40, into the first receptacle, formed by the left-hand portion of the tray 10 (see FIG. 2) as described above.

The water can flow out through the opening 40 because the opening 40 is not sealed to the bottom 16 of the tray 10. If required, the underside of the unit 12 and/or the upper surface of the tray bottom 16, may be formed with projections or otherwise shaped to raise the opening 40 from the tray bottom 16 so as to prevent any possibility of sealing of the opening 40 by the tray bottom 16.

The water level in the tray 10 rises until this water can flow over the top of the partition wall 22 into the second receptacle and subsequently over the horizontal edge 50 of the opening 48 into the air space 46.

The water which thus flows into the second receptacle wets the bottom of the pot 14 and, thus, serves to irrigate a plant in the pot 14.

The water which flows over the opening edge 50 inot the air space 46, and which of course falls to the bottom of the air space 46, rises to the level of the lower end 56 of the tubular air passage portion 54 and, thus, closes the air passage and prevents the entry of further air through the air passage into the air space 36. This closure of the air passage interrupts the outflow of water from the air water supply unit 12 through the outlet opening 40 while the lower end 56 of the air passage remains closed by the water in the air space 46.

Over a period of time, the water above the level $L_1$, and, subsequently, the water remaining in the second receptacle is consumed by the plant in the pot 14 and by evaporation.

Eventually, the water within the air space 46 also evaporates, at a rate which is determined by the size of the opening 48 and the corresponding opening in the rear wall 26 and by the dryness of the ambient atmosphere, to a sufficient extent to allow air to enter the lower end 56 of the air passage, and thus to allow a further outflow of water from the air supply unit 12.

In this connection, reference is made to FIGS. 5A through 5C for a more detailed illustration of the variations of the water level within the air space 46.

As shown in FIG. 5A, the surface of the water has fallen, by evaporation, to a level $L_4$, so that the water, by surface tension, forms a neck 60 at the lower end 56 of the air passage.

After a slight additional amount of evaporation of the water from the air space 46, the water level falls slightly further, and the neck 60 is thereby broken. A small amount of water then falls from the tube 54 through the lower end 56, thereby evacuating the tube 54, and the surface of the water in the air space 46 assumes a level $L_5$ which is slightly higher than the level $L_4$, shown in FIG. 5B.

The water remaining in the tube 52 is displaced upwardly through the upper end of the tube 52 and the air passage is now open to the atmosphere, so that the air can flow into the air space 36, as described above, to allow a conseqeuntial outflow of water from the water supply unit 12 through the opening 40.

When the water then flows into the air space 46 over the lower edges 50 of the opening 48, the water level at the tube 54 rises as a result of surface tension in the water to a level $L_6$, as shown in FIG. 5C, which is slightly above the level $L_3$ of the weir formed by the opening lower edge 50. The above-described cycle is then repeated by evaporation of the water from the air space 46.

Thus, the above-described watering device does not merely flood the second receptacle and thereby irrigate the plant after the elapse of a period of time, but does so repeatedly, so that the plant is intermittently watered at successive intervals of time.

The use of the small diameter tube 52 in conjunction with the large diameter tube 54 has the advantage that the large diameter of the tube 54 ensures that water drops from the tube, as described above, when the neck 60 is broken, thus ensuring that the water remaining in the tube 52 is pushed upwardly by atmospheric pressure from the tube 52. If the tube 54 were of small diameter, water might be retained in the tube 54 by surface tension, thus preventing the inflow of air into the air space 36. Also, if the tube 52 were of large diameter, sufficient water could drop from the tube 54 on breakage of the neck 60 to cause premature reclosure of the lower end 56 of the tube 54 by the water in the air space 46, thus preventing the above-described flooding of the receptacles through the opening 40.

Also, the small diameter of the tube 52 ensures that only a small amount of water is expelled from the air space 46 into the tube 54 in response to any increases in the ambient atmospheric pressure, which amount is insufficient to significantly affect the cycle of operation of the apparatus.

If water is driven by atmospheric pressure from the air space 46 into the tubes 52 and 54 and from the first receptacle into the air space 36, or if the water becomes completely evaporated from the first receptacle, a bubble of air will enter the unit 12 through the opening 40, and thus allow a small outflow of water through the opening 40 but without initiating the flooding of the second receptacle.

During the operation of the device, the weir or partition wall 22 serves to retain water in the first receptacle, at the bottom of the unit 12, so as to prevent the escape of water from the unit 12.

If the weir 22 were absent, water would be constantly drawn from the tray into the plant pot, so that the plant would be watered continuously instead of intermittently.

The above-described water supply unit 12 may be modified, as illustrated in FIGS. 6 and 7, to enable the rate of evaporation of water from the air space 46, and thus the intervals of time between successive flows of water into the second receptacle, to be varied.

More particularly, as shown in FIGS. 6 and 7, the front wall 24 of the water supply unit 12 may be provided with a shutter or closure member 64 which is slideably adjustable in a vertical direction, in front of the opening 48, for varying the amount of the opening 48 which is open to the atmosphere.

The closure member 64 is adjustably supported by a pair of elongate projections 66 and 68 on the front surface of the front wall 24.

The projection 66 is formed with an inclined side surface 67 for sliding engagement with a complimentary inclined edge of the closure member 64 and, thus, allows sliding movement in a vertical direction of the closure member 64 while retaining the closure member 64 from displacement away from the outer surface of the front wall 24.

The longitudinal projection 68 is formed with a serrated or saw-toothed side surface 69 which is resiliently engaged by a pair of detent members 70 on spring arms 71 formed in one piece with the closure member 64, which is made of synthetic plastic material. The resilience of the spring arms 71 both retains the closure member 64 in engagement with the projection 66 and 68 and, also, allows the closure member 64 to be adjusted vertically in position for the purpose mentioned above.

As indicated above, the water supply unit 12 is replenished through the opening 40, and is inverted for this purpose, as finger being held over the opening 40 to prevent the egress of water from the water supply unit 12 which it is being restored to its non-inverted condition and replaced on the tray 10.

Figure 8:
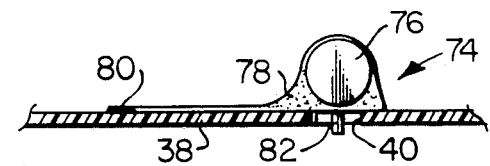
FIG. 8 shows a view taken in vertical cross-section through a broken-away portion of a modification of the device of FIG. 1.

To facilitate the replenishment of the water supply unit 12, the opening 40 may be provided with a flap valve as indicated generally by reference numeral 74 in FIG. 8.

The flap valve 74 comprises a spherical weight in the form of a ball 76 of glass, metal or other material, which is embedded in one end of a resilient flap 78 made of soft, readily flexible synthetic plastic material. The opposite end of the flap 78 is secured by adhesive 80 to the interior or upper surface of the water supply unit bottom 38, in the space between the vertical partition wall 44 and the sidewall 28 of the water supply unit 12.

The flap 78 is positioned so that the ball 76 is located over the opening 40 and, when the water supply unit 12 is in its non-inverted position but not resting on the tray 10 or any other support surface, causes the flap 78 to be pressed downwardly onto the margin of the opening 40 and, thus, seals the opening 40 in a water-tight manner.

The flap 78 is formed with an integral depending cylindrical projection 82, which extends downwardly from the flap 78 to project beyond the underside of the bottom 38.

Consequently, when the water supply unit 12 has been replenished, in an inverted position, through the opening 40, and is then restored to its non-inverted position, the flap valve 74 is closed, as described above, to thereby close the opening 40 and therefore to prevent the egress of water through the opening 40

However the thus-replenished water supply unit is again deposited in its position on the tray 10, the downwardly protruding projection 82 is pressed upwardly, relative to the bottom 38 and the opening 40, by contact of the projection with the upper surface of the tray bottom 16.

The flap valve 74 is thereby opened to allow the outflow of water from the water supply unit 12 into the tray 10 in the above-described manner.

Thus, the flap valve 74 keeps the opening 40 closed until the water supply unit 12 has been restored to its normal position of use or, of course, until the water supply unit 12 is deposited in a non-inverted condition on any support surface.

Instead of the projection 82 formed on the flap 78, an upwardly extending projection could be provided on the tray 10 so as to extend upwardly through the opening 40 and thereby open the flap valve 74 as the water supply unit is deposited on the tray.

When the water supply unit 12 is refilled in its inverted position, the small gap between the tube 52 and the top 32 of the water supply unit 12 is filled with water. Upon subsequent restoration of the water supply unit 12 to its upright or non-inverted condition, the water supply unit 12 can be held suspended for a short period of time to allow water to drain downwardly through the tubes 52 and 54, and the flap valve 74 allows small bubbles of air to enter the hole 40 and to percolate upwardly through the water to the space 36. The amount of water which thus escapes into the space 46 determines the water level in the space 46 immediately after the water supply unit 12 has been deposited onto the tray and thus, determines whether the unit is fully stalled (corresponding to FIG. 5C) or partly stalled, (i.e. with the tube lower end 56 closed but with the water level below level $L_6$) or whether the tray 10 is replenished as described above from the water supply unit 12 as the latter is deposited on the former.

In a still further embodiment of the invention, the above-described apparatus is modified by the addition of a suitable support, e.g. in the form of a slab-shaped body of plastic material, which may be inserted between the underside of either the water supply unit 12 or the plant pot 14 and the tray bottom 16.

When the support is inserted beneath the plant pot 14, the volume of water which reaches the plant pot 14 is during each watering cycle of operation of the device correspondingly reduced. On the other hand, when the support is inserted beneath the water supply unit 12, the amount of water received by the plant at each watering is increased.

It will be apparent that such a support may be provided in any of numerous different forms and that the amount of elevation of the plant pot or the water supply unit which is achieved by utilization of the support is suitably selected in accordance with the dimensions of the apparatus to produce the desired amount of watering of the plant.

It will also be readily apparent to those skilled in the art that various modifications may be made in the above-described embodiments of the invention and, accordingly, the scope of the present invention is not restricted to the features of the watering device illustrated in the drawings and described above but may be varied within the spirit and scope of the accompanying claims.

I claim:

1. A repeatedly operating watering device, comprising:
    a water reservoir;
    said water reservoir defining a first air-tight space within an upper portion of said reservoir;
    means defining an outlet at the bottom of said water reservoir for the outflow of water from said water reservoir;
    a first water receptacle for receiving flows of water from said water reservoir; and
    means for controlling the flows of water from said water reservoir through said outlet to said first water receptacle;
    said water flow controlling means comprising:
    means defining a second air space disposed below said first air space and adjacent said first receptacle;
    means providing communication between said second air space and the atmosphere;
    means defining an air passage having a top end in said first air-tight space and a bottom end in said second air space; and
    means providing communication between said first water receptacle and said second air space at a predetermined level, whereby said passage bottom end is immersed to prevent flow of the water from said water reservoir to said first water receptacle until evaporation of water from said second air space allows the entry of air through said air passage to said first air space and, thus, a flow of water from said water reservoir to said first water receptacle;

a second receptacle for receiving water from said first receptacle; and weir means between said first and second receptacles for allowing filling of said second receptacle with water from said first receptacle, said weir means retaining water in said first receptacle to prevent the entry of air through said opening during consumption of the water in said second receptacle.

2. A repeatedly operating watering device as claimed in claim 1, wherein said means defining communication between said water receptacle and said air space comprise an opening through which the water in said air space can evaporate to the atmosphere.

3. A repeatedly operating watering device as claimed in claim 2, further comprising means for adjustably varying the size of said opening to thereby vary the rate of evaporation of the water from said second air space and, thus, the time periods between successive water flows from said water reservoir to said first and second receptacles.

4. A repeatedly operating watering device as claimed in claim 1, wherein said first and second receptacles comprise first and second portions of an open-topped water container, and said weir means comprise a partition wall separating said first and second water container portions.

5. A repeatedly operating watering device as claimed in claim 1, wherein said water reservoir and said water flow controlling means are formed as a unit separate from said first and second receptacles.

6. A repeatedly operating watering device as claimed in claim 1, wherein said air passage comprises a first tube extending downwardly from said open upper end and a second tube at the lower end of said first tube, said second tube forming said open lower end and having a diameter substantially greater than that of said first tube.

7. A repeatedly operating watering device as claimed in claim 1, further comprising valve means associated with said outlet for opening said outlet upon inversion of said water reservoir for refilling of said water reservoir and for closing said outlet upon restoration of said water reservoir to a non-inverted condition, said valve means including means for opening said valve means upon deposition of said water reservoir into an operative position.

* * * * *